W. B. QUARTON.
Grain Drill.

No. {85, 31,089.}

Patented Jan. 8, 1861.

Witnesses.
J. W. Coombs.
C. W. Hughes.

Inventor:
W. B. Quarton
per Munn & Co.
Attys.

UNITED STATES PATENT OFFICE.

W. B. QUARTON, OF CARLINVILLE, ILLINOIS.

IMPROVEMENT IN SEEDING-MACHINES.

Specification forming part of Letters Patent No. 31,089, dated January 8, 1861.

*To all whom it may concern:*

Be it known that I, WILLIAM B. QUARTON, of Carlinville, in the county of Macoupin and State of Illinois, have invented a new and Improved Wheat-Roller; and I do hereby declare that the following is a full, clear, and exact description thereof, reference being had to the accompanying drawings, making part of this specification, in which—

Figure 1:
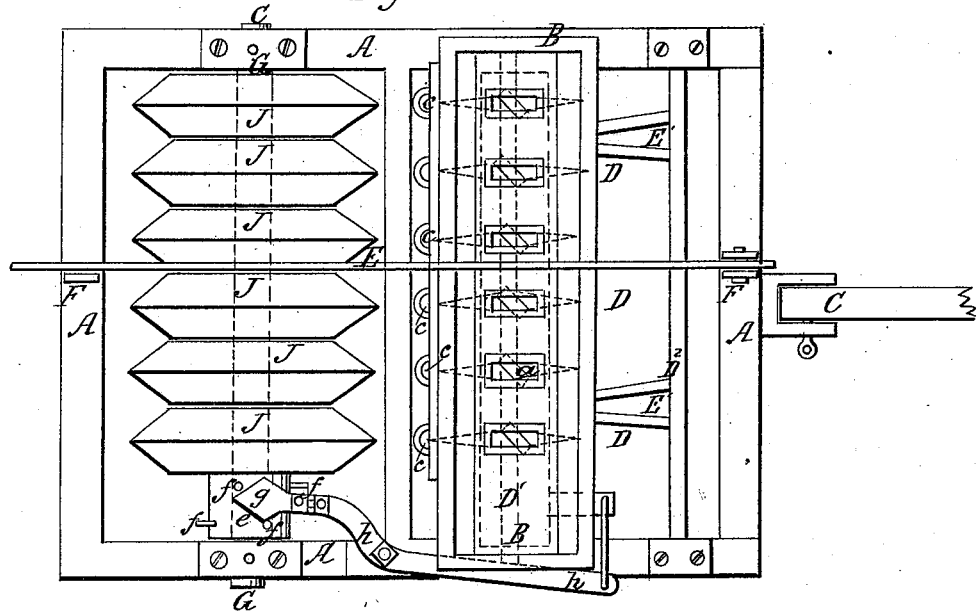
Figure 2:
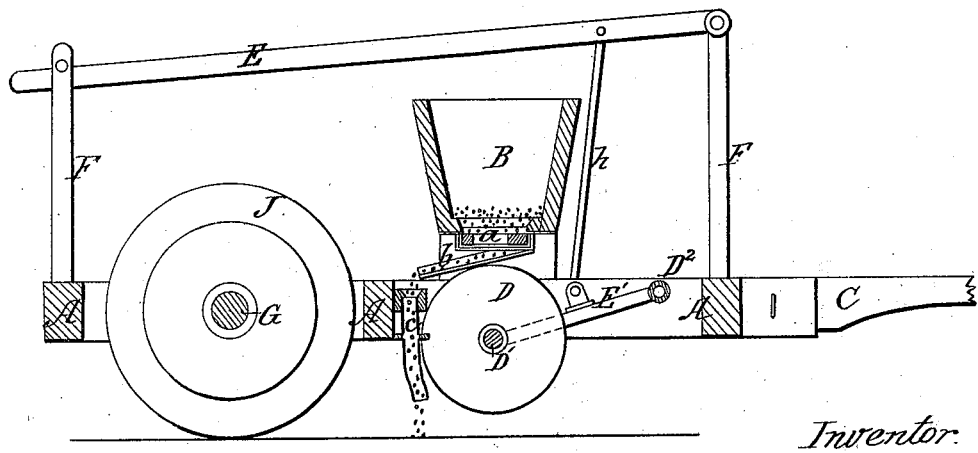

Figure 1 represents a plan view of a seeding-machine with my improved roller applied thereto. Fig. 2 is a vertical longitudinal section taken through the seed-dropping apparatus and the roller-shaft.

Similar letters of reference indicate corresponding parts in both figures.

This invention is an improvement in rollers for rolling in wheat immediately after it has been sown, the object of which improvement is to press the grain into the soil in the center of furrows which will convey the water off rapidly, and thus prevent the water from spreading over and soaking into the ground to the injury of the wheat, and the furrows and ridges retain the snow to a great degree from being blown off by the winter winds, and thus protect the seed from freezing; and, still more important, the wheat, being deposited in the bottom of furrows in which the earth is pressed compactly about it, is effectually prevented from being thrown out of the ground by frosts and subsequent thawing of the soil.

To effect these objects I employ a peculiar roller, which is to be combined with the seeding device and press the seed into the ground in a regular succession of ridges and furrows, which roller consists of a number of wheels that are placed side by side on a fixed shaft, each of which will be capable of an independent motion of the others, and each of which is so constructed and placed on their shaft that it will rise or fall and accommodate itself to the inequalities of the surface of the ground independent of the others, while they (the wheels) will each form a deep V-shaped furrow and corresponding ridge and plant and press the seed completely into the soil, as will be hereinafter understood by a description of the invention.

To enable those skilled in the art to fully understand my invention, I will proceed to describe its construction and operation.

A represents the frame-work of a seed-sowing machine, on top of which is placed the seed-hopper B. C is the draft-tongue, to which the horses are attached, and $a\ b\ c$ is the seed-dropping device, in which there is nothing claimed, as the roller may be applied to any ordinary seeding-machine for sowing wheat by projecting the frame A out a suitable distance behind the hopper to form bearings for said roller.

D D D are a gang of circular rotating cutters, which are secured to a horizontal transverse shaft, $D'$, at uniform distances apart. The shaft $D'$ has its bearings on the ends of two arms, $E'\ E'$, projecting from a transverse shaft, $D^2$, which has its bearings in each longitudinal bar of the frame A. The arms $E'\ E'$ of shaft $D^2$ incline toward the rear of the machine, and the circular cutters D D D are held by these arms $E'\ E'$ under the hopper-box B in front of and in line with the seed-tubes $c\ c\ c$ and the edges of the rollers J, so that these rollers will run in the track made by the circular plates D. The rod $h$ is jointed to the arms $E'\ E'$ and to a longitudinal lever, E, jointed at its front end to a perpendicular post, $F'$, which post projects up a suitable distance from the front cross-bar of frame A. The lever E extends back over the frame A to the rear end of this frame, where it is attached to a perpendicular post, F, so that it may be raised or depressed at its rear end and attached to the post F at any desired point. By thus raising or depressing the rear end of lever E it will be seen that the circular cutters D will be raised or depressed with it, and thus these cutters may be run at any desired depth for cutting through sods, &c., and preparing the soil for receiving the seed to be rolled in by the rollers J J, which follow in the tracks of the openings made by the cutters D D. The seed-tubes $c$ pass through holes that are in the roller-frame. They are thus kept in a line with the cutters.

G is an iron shaft, that passes transversely across the rear part of the frame A, and has its bearings in each side of this frame, and on this shaft are placed a number of wheels, J J J, the holes through the centers of which are somewhat larger than the diameter of the shaft G. The tread or periphery of each roller is beveled off both sides, so that the roller will form alternate V-shaped furrows and ridges in the surface of the ground over which they are rolled. These wheels or rollers J are placed close together on the shaft G, and the highest point of each roller is in a line with the seed-tubes and circular sod-cutters before referred to.

On one of the end rollers is cast or otherwise attached to it a hub, e, from which project pins f f, that are placed alternately from one side to the other of the hub e, so that they will give a vibrating motion to a lozenge-shaped piece, g, that is hinged to a lever h, Fig. 1, which lever operates the seed-slide.

The wheels J J, when arranged loosely on the shaft G, as before described, and drawn over the surface of the ground behind the seeding-machine, press the seed, after it has fallen in drill rows, into the soil in furrows and in the middle of these furrows. The end wheels or rollers J J are fixed to and turn with the shaft; but the intermediate rollers, on account of the holes through which the shaft passes being made much larger than the shaft, play loosely upon the shaft, and consequently accommodate themselves to the inequalities of the surface of the ground; besides, should a clod of earth or a stone or other substance get in the way, the entire number of rollers will not be raised from the ground, but only the roller that passes over the obstruction. The seed is thus sown and pressed regularly and uniformly.

I do not claim broadly the invention of conical rollers to form furrows; nor the employment of rollers that rise and fall upon their axle; nor the use of a diamond-pointed lever and pins upon a rotary shaft to give motion to the seed-slide; but,

Having thus described my invention, what I claim as new, and desire to secure by Letters Patent, is—

The arrangement of the rods E', cutters D, axle D', oscillating shaft D², rod h, lever E, seed-box B, rollers J, hub e, and hinged pivoted lever h, all as herein shown and described, for the purposes set forth.

W. B. +(his mark) QUARTON.

Witnesses:
D. W. BAGBY,
JONATHAN DAVIS.